Jan. 22, 1924.

G. A. CARNEY

VEHICLE LOCK

Filed Nov. 1, 1921

1,481,537

Inventor:
George A. Carney,
by Edward G. Allen.
his Atty.

Patented Jan. 22, 1924.

1,481,537

UNITED STATES PATENT OFFICE.

GEORGE A. CARNEY, OF BOSTON, MASSACHUSETTS.

VEHICLE LOCK.

Application filed November 1, 1921. Serial No. 512,150.

*To all whom it may concern:*

Be it known that I, GEORGE A. CARNEY, a citizen of the United States of America, and a resident of Boston, in the county of Suffolk and Commonwealth of Massachusetts, have invented certain new and useful Improvements in Vehicle Locks, of which the following is a specification.

This invention relates to a locking device for vehicles and more particularly for power driven vehicles or cars commonly used for pleasure or commercial purposes.

An object of the invention is to produce a simple yet effective locking means that may be applied to existing cars and removed therefrom with but slight exertion or loss of time on the part of the operator.

A further object is to so arrange the device that upon an attempt to move a car equipped therewith, the strain consequently created will be transmitted to a portion of the car well able to stand it without injurious effects thereupon.

Another object being to produce a lock which acts in conjunction with one of the wheels of a vehicle, preferably a forward one, but which imposes no strain upon that wheel when called upon to perform its function.

A still further object is to produce a lock which acts in the capacity of a chock which would effectively prevent a car running wild down hill, upon accidentally or otherwise releasing the brakes when said lock was positioned for use thereon.

The invention further consists in certain novel features of construction and arrangement of parts which will be fully understood from a description of the drawings and the claim hereinafter given.

Figure 1:
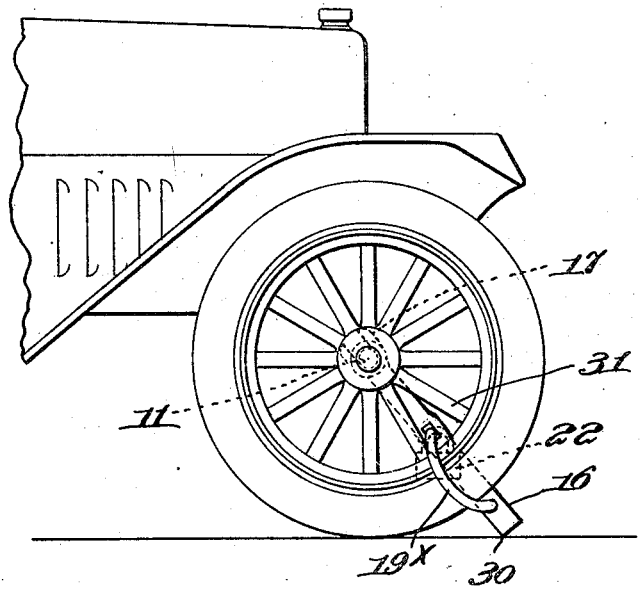

Of the drawings:

Figure 1 represents in side elevation a sufficient portion of a motor vehicle to enable the invention to be understood.

Figure 2:
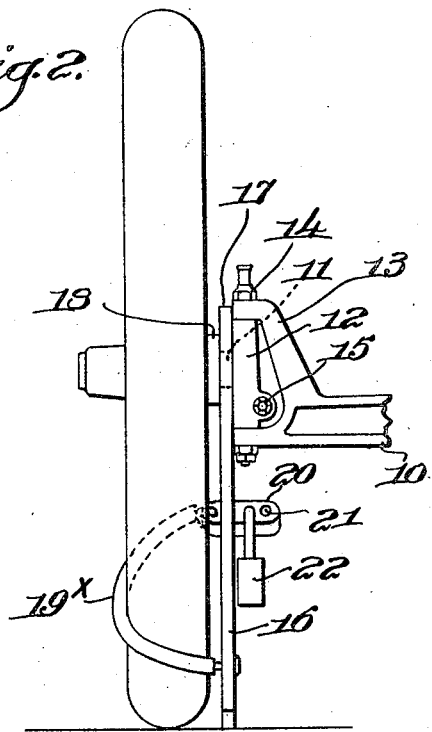

Figure 2 a front elevation of some of the parts shown in Figure 1 enlarged.

Figure 3:
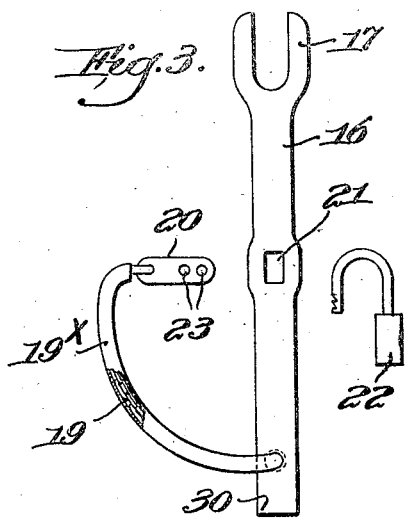

Figure 3 a detail of the lock bar ready to apply to a vehicle.

Referring to the drawings:

The invention herein is shown as applied to a well known make of car, but it will be understood that it is not the intention to limit the invention to this precise construction and arrangement, as it is obvious that with but slight change in the shape of the brace or lock bar, and its location for use, it may be applied to cars of various makes.

The type of car herein shown is a convenient one upon which to illustrate the invention, it having the usual front axle 10 to which the wheel carrying spindle 11, a portion of which is indicated by dotted line in Figures 1 and 2, is pivoted.

The said spindle being a part of the spindle body portion 12 pivotally held in the yoke 13 by means of the bolt 14, said body portion having a rearwardly extending arm fast at 15 to which a suitable rod may be attached for the purpose of steering, all as is well known in this type of car.

The brace or lock bar 16 has at its upper end, see Figure 3, a forked or bifurcated portion 17 adapted to straddle the spindle 11 which conveniently forms a neck between the hub 18 and the spindle body 12 and prevents side twist or play of the said bar 16.

At its lower end the bar has one end of a chain 19 securely attached thereto in any suitable manner, said chain being preferably encased in a tube of rubber, leather or other suitable material $19^x$ which is flexible and will not chafe or scratch the paint of a wheel when applied thereto. A block 20 is secured to the free end of the chain and is adapted to enter the hole 21 in the bar 16 where it will be held from withdrawal by the lock 22 which is adapted to engage either of the holes 23 in said block.

To apply the locking device to the car, the bar 16 will be placed with the fork 17 straddling the spindle 11 and the chain leading outwardly of the car. If convenient the bar may now rest on the ground and preferably so, and the chain led around the tire and rim of the wheel and the block passed between the spokes of the wheel and into the hole 21, whereupon the lock 22 will be attached to the block 20.

The lock 22 may be of any suitable design or structure, and if deemed necessary the block 20 may be dispensed with and one of the endmost links of the chain used to engage the lock. By so doing it obviously would lend an additional feature to the invention, viz: greater range of adjustment than could be accomplished by the use of the block.

While this adjustable feature is a useful one it is not absolutely an essential one, as it will be readily understood that a vehicle lock made for a certain type of car would be provided with the required length of chain in which instance the block would preferably be used.

As it is intended that the strain incident to an attempt to move the car when the locking device is attached thereto shall not be imposed upon the wheel the office or function of the chain 19 will be readily understood. In other words, the chain acts to retain the bar 16 in its proper place relatively to the spindle 11 and by reason of engagement with one or the other of the spokes between which it passes would compel the bar to assume its operative position upon rotation of the wheel in either direction.

As shown in Figure 1 of the drawing the bar is so positioned and is of such length that an attempt to move the car forward would result in a tendency to raise the wheel off the ground as it is evident that the corner 30 of the bar would grip the ground or pavement and forward movement of the car could not take place.

If, however, the bar failed to grip the ground as stated, the spoke 31 would meet the covered chain and a light pull thereon would ensure the gripping of the bar and thereafter all the strain due to the car movement would be imposed upon the spindle 11 excepting the slight amount which the spoke would receive without injury to itself. It is known that a lock is in use which embraces the rim and tire of a vehicle and which imposes all the strain of car movement upon the said rim and tire but it is not known that a locking device is in use that is positioned for use by the rotation or partial rotation of the wheel and which imposes or directs the strain of car movement upon or to a relatively strong portion of the car exterior to the wheel.

It is therefore the intention to claim broadly a locking device of this class that may be positioned for action by wheel rotation and which imposes the strain incident to car movement upon a portion of the car, exterior of the wheel.

Having described the invention I claim:

A vehicle lock of the class described consisting of a one piece brace bar having a fork at one end thereof the tynes of which are of appreciable length and adapted to straddle a stationary spindle of a vehicle wheel; a vehicle wheel; a chain, one end of which is permanently secured to the bar adjacent the other end thereof at a point outside the radius of said wheel, said bar having an opening intermediate said fork and the secured end of said chain at a point adjacent the inner periphery of said wheel, a block, having holes therein, secured to the other end of said chain and adapted to enter said bar opening, said chain embracing said wheel tire in a manner whereby radial dislodgement of the forked end of said bar is prevented; and a lock to retain said block in said opening.

Signed by me at Boston, Mass., this 31st day of October, 1921.

GEORGE A. CARNEY.